US011852922B2

(12) United States Patent
Lee et al.

(10) Patent No.: US 11,852,922 B2
(45) Date of Patent: Dec. 26, 2023

(54) BACKLIGHT UNIT AND DISPLAY DEVICE INCLUDING THE SAME

(71) Applicant: LG Display Co., Ltd., Seoul (KR)

(72) Inventors: RokHee Lee, Paju-si (KR); Hyunmin Park, Paju-si (KR); MyungWon Seo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/857,577

(22) Filed: Jul. 5, 2022

(65) Prior Publication Data

US 2023/0026878 A1      Jan. 26, 2023

(30) Foreign Application Priority Data

Jul. 13, 2021   (KR) .................. 10-2021-0091871

(51) Int. Cl.
*G02F 1/13357*   (2006.01)
*F21V 8/00*   (2006.01)

(52) U.S. Cl.
CPC ...... *G02F 1/133611* (2013.01); *G02B 6/0065* (2013.01); *G02F 1/133605* (2013.01); *G02F 1/133606* (2013.01); *G02B 6/0051* (2013.01); *G02B 6/0055* (2013.01); *G02F 1/133603* (2013.01)

(58) Field of Classification Search
CPC ......... G02F 1/133611; G02F 1/133603; G02F 1/133606; G02F 1/133607; G02F 1/133605; G02B 6/0055; G02B 6/005; G02B 6/0051; G02B 6/0065
See application file for complete search history.

(56) References Cited

U.S. PATENT DOCUMENTS

| | | | |
|---|---|---|---|
| 2006/0204679 A1* | 9/2006 | Jones | C08J 5/005 428/1.3 |
| 2007/0160811 A1* | 7/2007 | Gaides | G02B 5/003 428/173 |
| 2011/0205448 A1* | 8/2011 | Takata | G02B 6/0055 348/739 |
| 2019/0094619 A1* | 3/2019 | Park | G02F 1/133605 |
| 2020/0004086 A1* | 1/2020 | Ting | G02F 1/133606 |
| 2020/0135993 A1* | 4/2020 | Yamamoto | H01L 33/60 |
| 2020/0183234 A1* | 6/2020 | Kim | G02F 1/133611 |
| 2022/0269130 A1* | 8/2022 | Chou | G02B 6/0051 |

FOREIGN PATENT DOCUMENTS

| | | | | |
|---|---|---|---|---|
| CN | 114174359 A | * | 3/2022 | ............ C08F 2/44 |
| KR | 20060041140 A | * | 5/2006 | |
| KR | 20110115739 A | * | 10/2011 | |
| WO | WO-2020214047 A1 | * | 10/2020 | |

* cited by examiner

*Primary Examiner* — Erin Kryukova
(74) *Attorney, Agent, or Firm* — Fenwick & West LLP

(57) ABSTRACT

A backlight unit and a display device including the backlight unit is disclosed The backlight unit includes a light source protective element located on light sources, a base film located on the light source protective element, and a plurality of optical path control patterns, each of which is located to overlap a corresponding one of the light sources, that are disposed on at least one of both surfaces of the base film and configured to direct traveling paths of at least some of incident light rays, the optical path control patterns including an acrylic-based resin or a polyester-based resin and at least one type of inorganic particles dispersed in the resins, thereby enabling a thickness of the backlight unit to be reduced and image quality to improve.

17 Claims, 12 Drawing Sheets

FIG.11

|  | Embodiment 1 | | | Embodiment 2 |
|---|---|---|---|---|
| Thickness of the light-directing pattern | 8μm ~ 15μm | | | 20μm ~ 30μm |
| Content of the plurality of inorganic particles | 50 wt % | 42 wt % | 35 wt % | 10 to 15 wt % |
| *Lattice pattern defect levels (1-5 levels) | 1.5 | 1 | 1.5 | 1~2 |

[ Level: 1 to 2 ]   [ Level: 3 to 5 ]

BACKLIGHT UNIT AND DISPLAY DEVICE INCLUDING THE SAME

CROSS-REFERENCE TO RELATED APPLICATION

This application claims the priority benefit of Republic of Korea Patent Application No. 10-2021-0091871, filed on Jul. 13, 2021 in the Korean Intellectual Property Office, which is hereby incorporated by reference in its entirety.

BACKGROUND

Field of the Disclosure

The present disclosure relates to a backlight unit and a display device including the backlight unit.

Description of the Background

A display device typically includes a display panel in which a plurality of sub-pixels are disposed, and several types of driving circuits for driving elements disposed in the sub-pixels. According to the different types of display devices, some display devices may include a backlight unit for supplying light to the display panel.

The backlight unit can include a plurality of light sources, and a plurality of optical elements. The backlight unit can be disposed on a side or portion of the display device that faces away from a viewing surface of the display panel and supply light to the display panel.

As the light sources and the optical elements are included in the backlight unit, such a typical display device has been suffered from an increased thickness. When the thickness of the backlight unit is designed to be reduced in order to reduce the thickness of the display device, a sufficient optical gap between the light source and the display panel may not be formed, in turn, image quality can be degraded. Further, considering that the luminance of the display panel can be improved as the amount of light provided to the display panel increases, a high level of driving current can be required to increase the amount of light provided to the display panel, and in this case, the optical element can be damaged.

SUMMARY

To solve these problems, a backlight unit is disclosed that has a reduced thickness and excellent image quality, and is capable of maintaining optical properties without damaging an optical element even when driven with a high level of driving current, and a display device including the backlight unit.

Embodiments of the present disclosure provide a backlight unit, which supplies light to a display panel, has a reduced thickness and is capable of improving the quality of images viewed through the backlight unit, and a display device including the backlight unit.

Embodiments of the present disclosure provide a backlight unit capable of maintaining optical properties without damaging an optical element even when driven with a high level of driving current, and a display device including the backlight unit.

According to one embodiment of the present disclosure, a backlight unit comprises: a plurality of light sources on a printed circuit; a light source protective element on the plurality of light sources; a base film on the light source protective element; and a plurality of optical path control patterns on at least one surface of the base film, each of the plurality of optical path control patterns overlapping a corresponding light source from the plurality of light sources and configured to control optical paths of light generated by the corresponding light source that is incident on the optical path control pattern, wherein the plurality of optical path control patterns comprise an acrylic-based resin or a polyester-based resin and at least one type of inorganic particles dispersed in the acrylic-based resin or the polyester-based resin.

According to one embodiment of the present disclosure, a backlight unit comprises: a reflective plate comprising a plurality of holes; a plurality of light sources, each of the plurality of light sources disposed in a corresponding one of the plurality of holes; a light source protective element on the plurality of light sources within the plurality of holes; a base film on the light source protective element; and a plurality of optical path control patterns on at least one surface of the base film, each of the plurality of optical path control patterns overlapping a corresponding light source from the plurality of light sources and configured to control optical paths of light generated by the corresponding light source that is incident on the optical path control pattern, wherein a height of the reflective plate is greater than a height of the plurality of light sources.

According to embodiments of the present disclosure, a backlight unit supplying light to a display panel can be provided that is capable of improving the quality of images viewed through the backlight unit while having a reduced thickness by including at least one light-directing pattern located or disposed to correspond to at least one light source, and a display device including the backlight unit.

According to embodiments of the present disclosure, a backlight unit can be provided that is capable of maintaining optical properties without damaging an optical element even when driven with a high level of driving current by including at least one light-directing pattern including one or more materials in various contents, and a display device including the backlight unit.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings:

FIG. 11 illustrates specific conditions of the light-directing pattern according to embodiments 1 and 2 and corresponding lattice pattern defect levels (lattice mura levels)

DETAILED DESCRIPTION

Figure 1:
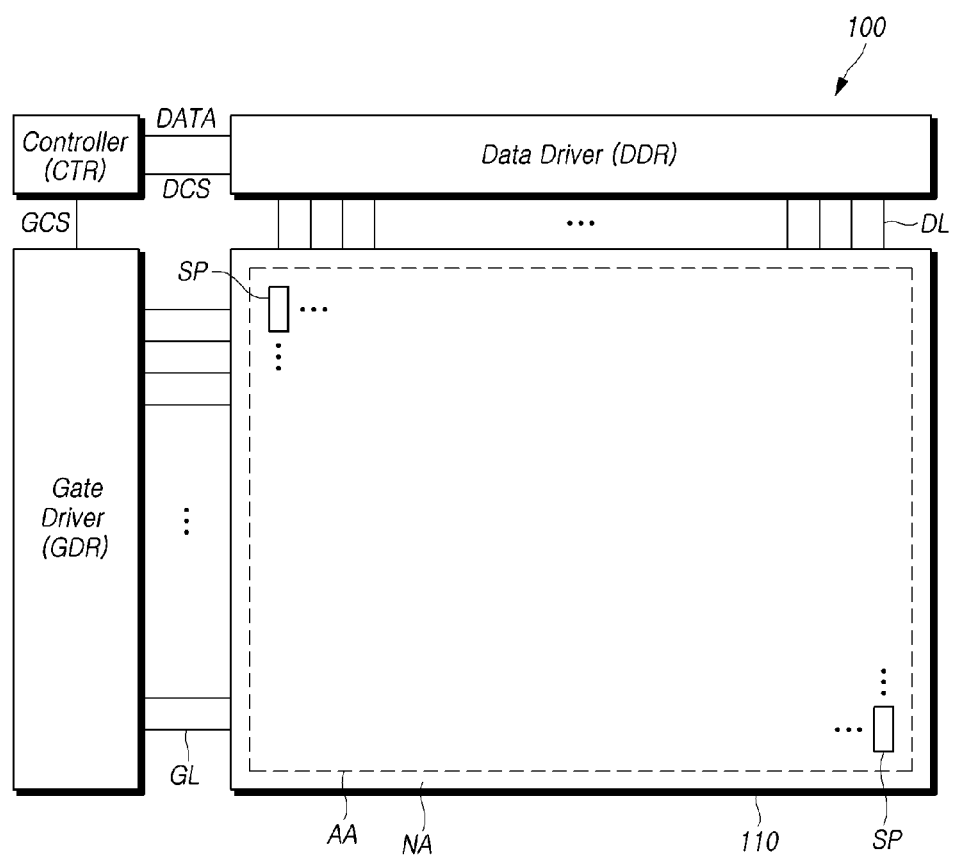
FIG. 1 schematically illustrates a configuration of a display device according to one embodiment of the present disclosure.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, with reference to the accompanying drawings, various embodiments of the present disclosure will be described in detail.

FIG. 1 schematically illustrates a configuration of a display device 100 according to embodiments of the present disclosure.

Referring to FIG. 1, the display device 100 includes a display panel 110 including an active area AA and a non-active area NA, a gate driving circuit GDR, a data driving circuit DDR, and a controller CTR, for driving the display panel 110.

In the display panel 110, a plurality of gate lines GL and a plurality of data lines DL may be disposed, and a plurality of subpixels SP may be disposed in areas where the gate lines GL and the data lines DL intersect.

The gate driving circuit GDR can be controlled by the controller CTR, and can control driving timings of the subpixels by sequentially outputting scan signals to the gate lines GL disposed in display panel 110.

The gate driving circuit GDR may include one or more gate driver integrated circuits GDIC. The gate driving circuit GDR may be located on one side or both sides of the display panel 110, such as, a left or right edge, a top or bottom edge, left and right edges, or top and bottom edges, according to a driving scheme.

Each gate driver integrated circuit GDIC may be connected to a pad, such as a bonding pad, of the display panel 110 in a tape automated bonding (TAB) type or a chip on glass (COG) type, be directly disposed in the display panel 110 as being implemented in a gate in panel (GIP) type, or in some instances, be disposed in a manner of being integrated in the display panel 110. Further, each gate driver integrated circuit GDIC may be implemented in a chip on film (COF) type in which the gate driver integrated circuit GDIC is mounted on a film connected to display panel 110.

The data driving circuit DDR can receive image data from the controller CTR and then convert the received image data into analog data voltages. The data driving circuit DDR can output the data voltages to respective data lines DL according to timings at which scan signals through the gate lines GL are applied, and enable each subpixel SP to emit light in line with the image data.

The data driving circuit DDR may include one or more source driver integrated circuits SDIC.

Each source driver integrated circuit SDIC may include a shift register, a latch circuit, a digital to analog converter, an output buffer, and the like.

Each source driver integrated circuit SDIC may be connected to a pad, such as a bonding pad, of the display panel 110 in the tape automated bonding (TAB) type or the chip on glass (COG) type, be directly disposed in the display panel 110 as being implemented in the gate in panel (GIP) type, or in some instances, be disposed in a manner of being integrated in the display panel 110. Further, each source driver integrated circuit SDIC may be implemented in the chip on film (COF) type. In this case, each source driver integrated circuit SDIC may be mounted on a film connected to the display panel 110, and be electrically connected to the display panel 110 through lines on the film.

The controller CTR can provide several control signals to the gate driving circuit GDR and the data driving circuit DDR, and control operations of the gate driving circuit GDR and the data driving circuit DDR.

The controller CTR may be mounted on a printed circuit board (PCB), a flexible printed circuit (FPC), and/or the like, and be electrically connected to the gate driving circuit GDR and the data driving circuit DDR through the printed circuit board (PCB), flexible printed circuit (FPC), and/or the like.

The controller CTR can enable the gate driving circuit GDR to output a scan signal according to a timing processed in each frame, convert image data input from an external source, such as an external device, a network, a host system, and/or the like, to a data signal form used in the data driving circuit DDR, and then output image data resulted from the converting to the data driving circuit DDR.

The controller CTR can receive, in addition to the image data, several types of timing signals including a vertical synchronous signal VSYNC, a horizontal synchronous signal HSYNC, an input data enable signal DE, a clock signal CLK, etc. from the external source.

The controller CTR can generate several types of control signals using the several types of timing signals received from the external source and output the generated signals to the gate driving circuit 120 and the data driving circuit 130.

For example, to control the gate driving circuit GDR, the controller CTR can output several types of gate control signals GCS including a gate start pulse GSP, a gate shift clock GSC, a gate output enable signal GOE, and the like.

The gate start pulse GSP can be used to control operation start timings of one or more gate driver integrated circuits GDIC included in the gate driving circuit GDR. The gate shift clock GSC is a clock signal commonly inputted to one or more gate driver integrated circuits GDIC, and can be used for controlling a shift timing of a scan signal. The gate output enable signal GOE can be used for indicating timing information of one or more gate driver integrated circuits GDIC.

Further, to control the data driving circuit DDR, the controller CTR can output several types of data control signals DCS including a source start pulse SSP, a source sampling clock SSC, a source output enable signal SOE, and the like.

The source start pulse SSP can be used to control data sampling start timings of one or more source driver integrated circuits SDIC included in the data driving circuit DDR. The source sampling clock SSC is a clock signal for controlling a sampling timing of data in each source driving integrated circuit SDIC. The source output enable signal SOE can be used for controlling an output timing of the data driving circuit DDR.

Further, the controller CTR can individually control respective luminance of one or more areas of the display panel 110 by controlling the light-emitting operation of a backlight unit of the display device 100 using local dimming technology.

The display device 100 may further include a power management integrated circuit for providing several types of voltages or currents to the display panel 110, the gate driving circuit GDR, the data driving circuit DDR, and the like, or for controlling the several types of voltages or currents to be provided.

Each subpixel SP may be an area defined by the intersection of a gate line GL and a data line DL, and a liquid crystal or a light emitting element may be disposed according to a type of the display device 100.

For example, in a case where the display device 100 is a liquid crystal display device, the liquid crystal display device may include a light source device such as a backlight unit illuminating light to the display panel 110, and liquid crystals can be disposed in the subpixels SP of the display panel 110. The display device 100 can produce brightness depending on image data and display images, by adjusting an alignment of liquid crystals through electric field formed as a data voltage is applied to each sub-pixel SP.

Figure 2:
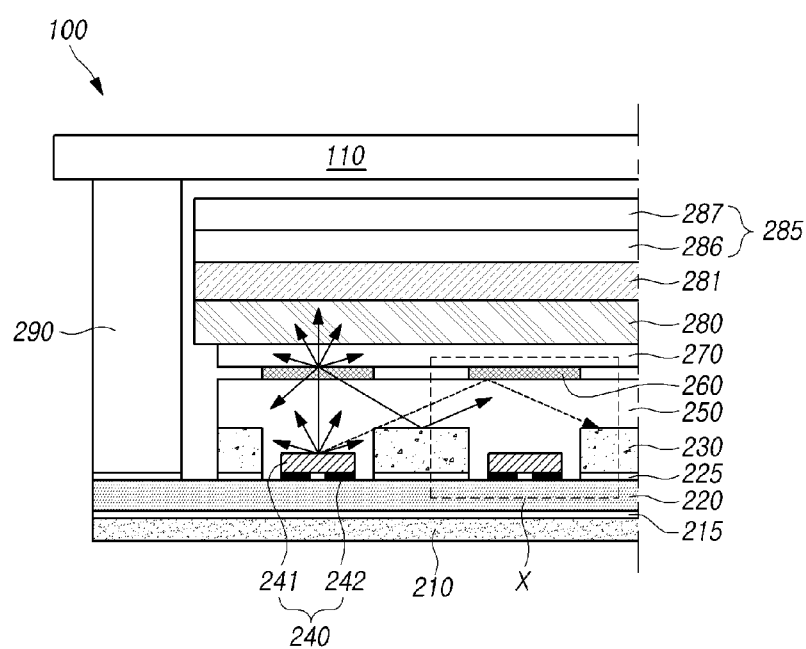
FIG. 2 illustrates an example structure of a backlight unit included in the display device according to one embodiment of the present disclosure.

FIG. 2 illustrates an example structure of a backlight unit included in the display device 100 according to embodiments of the present disclosure.

Referring to FIG. 2, the display device 100 may include the display panel 110, and a backlight unit disposed under the display panel 110 and providing light to the display panel 110.

For example, the backlight unit may include one or more light sources 240 disposed on a printed circuit 220. The printed circuit 220 may be bonded with a plate 210, for example, an upper surface thereof, with a first adhesive tape 215.

Here, the plate 210 may be a cover bottom according to a type of display device 100, or a design scheme. Further, a dam 290 for supporting the display panel 110 may be disposed over the plate 210 and outside of an area in which the light sources 240, an optical element, and the like are disposed.

Each light source 240 may include a light emitter 241 emitting light, and one or more electrodes 242 to which a signal for driving the light emitter 241 is applied.

The light sources 240 may be, for example, light emitting diodes (LED), mini LEDs, μLEDs, or the like. Accordingly, since the light sources 240 may be disposed such that the light sources 240, each or all of which is or are implemented on a chip, are mounted on the printed circuit 220, the thickness of the backlight unit can be reduced.

One or more of the light sources 240 can emit white light, and in some instances, emit light of a specific wavelength band. For example, a light source 240 can emit blue light, and a white light resulting from the exciting of the blue light by an optical element disposed over the light source 240 can be provided to the display panel 110.

A reflective plate 230 may be disposed on the printed circuit 220. The reflective plate 230 may be disposed such that the reflective plate 230 is bonded with the printed circuit 220, for example, an upper surface thereof, with a second adhesive tape 225.

The reflective plate 230 may include a plurality of holes, and one or some of the light sources 240 may be disposed inside of (e.g., within) each or some of the holes included in the reflective plate 230. For example, the reflective plate 230 providing a reflective function may be disposed in at least a part of an area in which the light sources 240 are not disposed on the printed circuit 220.

Here, in a case where the light sources 240 being implemented on a single chip or on respective chips are disposed, since sizes of the light sources 240 may be small, the reflective plate 230 may have a height greater than a height of the light sources 240. For example, an upper surface of the reflective plate 230 may be at a higher location than an upper edge of a light source 240 disposed in a hole of the reflective plate 230.

Accordingly, light traveling in a sideways direction from the light source 240 may be reflected from a side surface of the reflective plate 230 and then travel in a forward direction of the backlight unit, this enabling luminous efficiency of the backlight unit to further increase.

Further, in some instances, a coated reflective film may be disposed on the printed circuit 220.

That is, the coated reflective film may be disposed in the entire area or at least a part the printed circuit 220 or an area except for an area in which the light sources 240 are disposed, therefore, rendering luminous efficiency increased.

In this case, the coated reflective film on the printed circuit 220 can replace the function of the reflective plate 230, or can provide the reflective function together with the reflective plate 230 that is also included in the backlight unit.

A light source protective element 250 may be disposed inside of each, or one or some, of the plurality of holes of the reflective plate 230 and on the reflective plate 230.

The light source protective element 250 may include, for example, resin.

In a case where the light source protective element 250 includes resin, the light source protective element 250 may be formed such that a partition wall may be disposed in an edge of an area in which the light sources 240 are disposed on the printed circuit 220, or outside of the printed circuit 220, and resin is deposited inside of the partition wall.

In some instances, each, or one or some, of the plurality of holes of the reflective plate 260 may be filled with the light source protective element 250. Further, the light source protective element 250 may be disposed on the reflective plate 230.

The light source protective element 250 can protect all or at least a part of the light sources 240, and provide a function of diffusing light emitted from the light sources 240. That is, the light source protective element 250 may directly contact each, or one or more, of the light sources 240 to protect the light sources 240 and provide a light-guide function.

A base film 270 may be disposed on or over the light source protective element 250, and the base film 270 may be, for example, a transparent film such as polycarbonate (PC) or polyethylene terephthalate (PET). A plurality of optical path control patterns 260 (e.g., light directing patterns) may be disposed on at least one of an upper surface or a lower surface of the base film 270.

Here, an element including the base film 270 and the optical path control patterns 260 may be referred to as a light-directing film.

The plurality of optical path control patterns 260 may be light control patterns, and be disposed at respective locations corresponding to the light sources 240 on the bottom surface of the base film 270. That is, each optical path control pattern 260 may overlap a corresponding one of the light sources 240.

That is, all or at least a part of each, or one or some, of optical path control patterns 260 may be disposed to be overlapped with each light source 240, and when taking account of diffusion characteristics of light, be disposed to be overlapped with an area including an area in which each, or one or some, of optical path control patterns 240 are disposed.

For example, each optical path control pattern 260 may be disposed to correspond to all or at least a part of each hole formed in the reflective plate 230. In some instances, the area of each optical path control pattern 260 may be defined variously according to a design scheme.

For example, the area of each optical path control pattern 260 may be equal to that of a corresponding hole of the reflective plate 230. In another example, the area of each optical path control pattern 260 may be smaller, or greater, than that of a corresponding hole included in the reflective plate 230 according to intensity of light emitted from a corresponding light source 240, a distance between the light source 240 and the optical path control pattern 260, and the like.

The optical path control patterns 260 may have an equal reflectance or respective reflectances, and can scatter, reflect, diffract or transmit some of light emitted from the light sources 240.

The optical path control patterns 260 can scatter, reflect, diffract some of light emitted in a vertical direction or an inclined direction from the light sources 240. Further, the optical path control patterns 260 may be patterns capable of transmitting some of light emitted from the light sources 240.

For example, the optical path control patterns 260 can scatter light emitted from the light source 240 and cause the light to travel in a vertical direction or an inclined direction. In another example, the optical path control patterns 410 can reflect light emitted from the light sources 240 and cause the reflective plate 230 to reflect again the reflected light, thus, enabling the light to travel toward an area between the light sources 240.

That is, the disposing of the optical path control pattern 260 in an area in which the intensity of light emitted from the light source 240 is the strongest can reduce a difference in luminance between an area in which the light source 240 is disposed (an area in which an amount of light is relatively large) and an area between the light source 240 and a neighboring light source 240 (an area in which an amount of light is relatively small), or the like.

Thus, image quality of the backlight unit can be improved by adjusting a direction in which light emitted from the light sources 240 travels using the optical path control patterns 260. That is, luminance uniformity of the backlight unit can be improved by causing the optical path control patterns 260 to scatter, reflect, diffract or transmit light emitted from the light sources 240, therefore.

A diffusion plate 280 may be disposed on the base film 270 to diffuse light incident through the bottom surface of base film 310.

A color conversion sheet 281 may be disposed on the diffusion plate 280 to change a wavelength band of light emitted from the light source 240. Further, one or more optical sheets 285 may be disposed on the color conversion sheet 281. For example, a prism sheet 286, a diffusion sheet 287, and the like may be disposed on the color conversion sheet 500.

Here, respective locations at which the diffusion plate 280 and the color conversion sheet 281 are disposed may be interchanged.

The diffusion plate 280 can diffuse light passing through the base film 270.

The color conversion sheet 281 can provide the light of a specific wavelength band in response to incident light.

For example, when the light source 240 emits the light of a first wavelength band (e.g., blue light), the color conversion sheet 281 can provide the light of a second wavelength band (e.g., green light) and the light of a third wavelength band (e.g., red light) in response to incident light. Accordingly, the light of a white wavelength band may be provided to the display panel 110 through the color conversion sheet 281.

In some instances, the color conversion sheet 281 may be disposed on a partial area of the diffusion plate 280.

For example, when the light source 240 emits blue light, the color conversion sheet 281 may be disposed in an area except for an area corresponding to an area in which a blue subpixel SP is disposed in the display panel 110. That is, the color conversion sheet 281 may be disposed such that light that has not passed through the color conversion sheet 281 is allowed to reach the blue subpixel SP of the display panel 110.

The color conversion sheet 281 may not be disposed in any or some of the light sources 240.

For example, the color conversion sheet 281 may not be disposed in a case where the light source 240 emits white light, or in a case where a color conversion film emitting green light and red light is coated on a surface which light emitted from the light source 240 emitting blue light exits.

In this manner, according to embodiments of the present disclosure, the backlight unit can be provided that is capable of satisfying image quality while reducing the thickness thereof, by including the base film 270 on which at least one light-directing pattern 260 located to correspond to at least one light source 240 is disposed, and optical elements.

Further, according to embodiments of the present disclosure, the display device including the backlight unit can be provided that is capable of satisfying image quality while reducing the thickness of the backlight unit, by including the base film 270 on which at least one light-directing pattern 260 located to correspond to at least one light source 240 is disposed, and optical elements.

As the optical path control patterns 260 according to embodiments of the present disclosure include various materials and have various structures, a decrease in luminance of the backlight unit can be reduced or eliminated, and an image artifacts such as spots or the like on the display device cannot be recognized.

Figure 3:
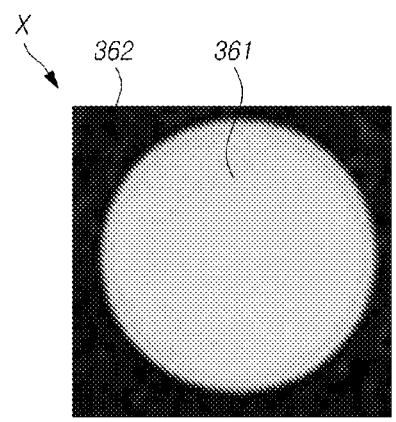
FIG. 3 illustrates an example image in a partial area of the backlight unit according to one embodiment of the present disclosure.

FIG. 3 illustrates an example image in a partial area of the backlight unit according to embodiments of the present disclosure.

The area of FIG. 3 may correspond to an X portion in FIG. 2 according to embodiments of the present disclosure.

Referring to FIG. 3, the backlight unit according to aspects of the present disclosure may include one or more light sources 240.

When the light source 240 is driven to emit light, the backlight unit may include a first area 361 and a second area 362 surrounding the first area 361.

The first area 361 may be an area in which traveling paths of some of light rays emitted from the light source 240 are changed by the optical path control pattern 260, and the second area 362 may be an area in which traveling paths of some of the light rays emitted from the light source 240 directly transmit the base film 270 without passing through the optical path control pattern 260, and thereafter, travel toward the display panel.

Example structures related to the image of FIG. 3 will be specifically discussed with reference to FIGS. 4 to 5.

Figure 4:
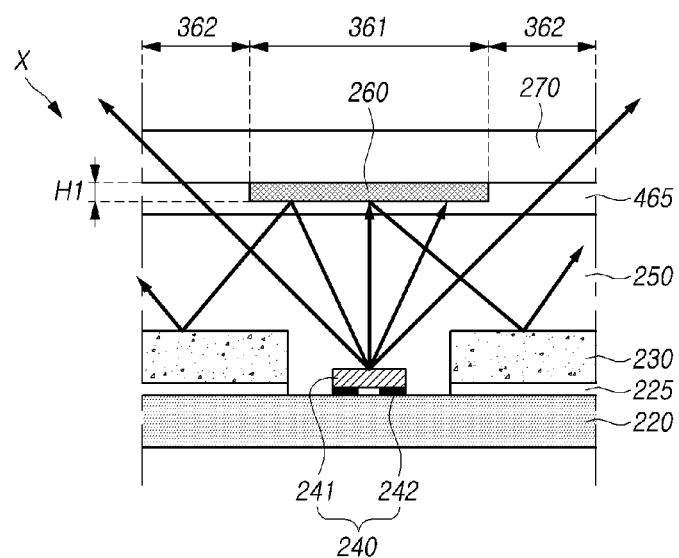
FIGS. 4 and 5 are examples of enlarged views representing an X portion of FIG. 2 according to embodiments of the present disclosure.
Figure 5:
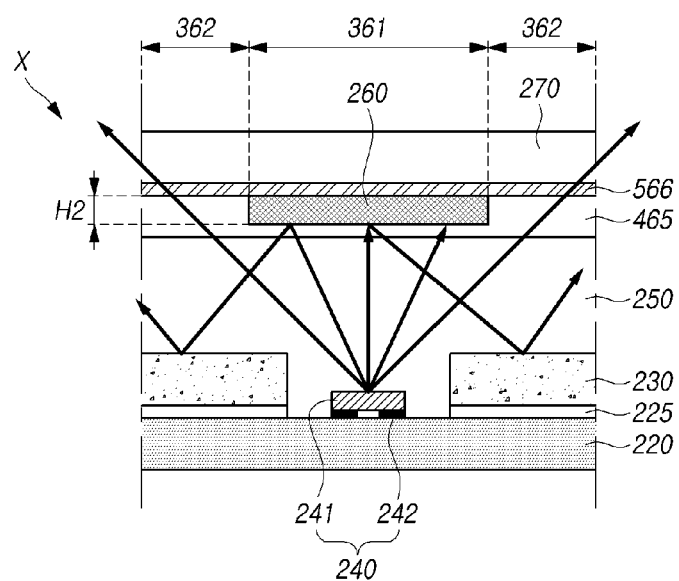

FIGS. 4 and 5 are example enlarged views of the X portion of FIG. 2 according to embodiments of the disclosure.

In the following description, some configurations, effects etc. of the embodiments or examples discussed above may not be repeatedly described for convenience of description. Further, in the following description, like reference numerals will be used for configurations or elements equal to those of embodiments or examples described above.

Referring to FIG. 4, the backlight unit may include the first area 361 and the second area 362 surrounding the first area 361. The first area 361 may include an area corresponding to an area in which the optical path control pattern 260 is disposed, and the second area 362 may include an area corresponding to an area in which the optical path control pattern 260 is not disposed.

In the first area 361, traveling paths of some of light rays emitted from the light source 240 may be changed by the optical path control pattern 260, and some of the light rays may transmitted through the optical path control pattern 260.

Further, in the second area 362, some of the light rays emitted from the light source 240 may directly enter the base film 270, or some or all of the light rays having the changed traveling paths due to the optical path control pattern 260 may enter the base film 270.

The backlight unit according to aspects of the present disclosure may include the optical path control pattern 260 and the adhesive layer 465 disposed between the light source protective element 250 and the base film 270.

Specifically, the optical path control pattern 260 may be disposed on one surface of the base film 270, and the adhesive layer 465 can serve to bond the base film 270 in which the optical path control pattern 260 is disposed and the light source protective element 250.

Materials included in the optical path control pattern 260 of FIG. 4 may include a polyester-based resin, a plurality of inorganic particles, and a solvent. At least one of these materials included in the optical path control pattern 260 is in the form of liquid (e.g., a type of ink). In this case, the optical path control pattern 260 may be white, but embodiments of the present disclosure are not limited thereto.

Specifically, the materials used for forming the optical path control pattern 260 of FIG. 4 may include the polyester-based resin, the plurality of inorganic particles, and the solvent.

Here, the polyester-based resin can serve as a matrix, the plurality of inorganic particles can serve to reflect light emitted from the light source 240, and the solvent, which is a low-viscosity material having volatility, can serve to facilitate the heat curing of the materials of the optical path control pattern 260 optical path control pattern 260.

The optical path control pattern 260 finally formed using such materials may include the matrix material and the plurality of inorganic particles. Further, in some instances, the optical path control pattern 260 finally formed may include the matrix material, the plurality of inorganic particles, and a small amount of the solvent.

The polyester-based resin, which is the matrix material of the light-directing pattern 260, may be a polyester resin, but types of polyester-based resins according to embodiments of the present disclosure are not limited thereto.

The matrix material of the optical path control pattern 260 may be a material similar to that of the base film 270. For example, the light-directing pattern 260 and the base film 270 may include a polyester-based resin.

As such, as the matrix material of the optical path control pattern 260 and the base film 270 include a series of materials corresponding to each other, adhesion between the optical path control pattern 260 and the base film 270 can be improved. In other words, since the optical path control pattern 260 can be formed on a surface of the base film 270 without a separate adhesive layer or a separate element, the process of manufacturing the backlight unit can be simplified, and the thickness of the backlight unit can become thinner.

In this case, the optical path control pattern 260 may correspond to (or have a shape corresponding to) one or more convex portions (or protrusions) protruding from at least one surface of the base film 270. The convex portion (or protrusion) of the base film 270 may include the plurality of inorganic particles. The color of the light-directing pattern 260 may be white, but the color of the light-directing pattern 260 according to embodiments of the present disclosure is not limited thereto.

The matrix material of the optical path control pattern 260 may be a material not being discolored by heat, light, and moisture.

In a case where the display device is a display device for realizing high luminance using a high driving current, even when heat is generated from the light source 240, the discoloring of the optical path control pattern 260 can be prevented or at least reduced by the matrix material, and thus, the reflectance of the light-directing pattern 260 can be maintained. For example, in a situation where the matrix material of the optical path control pattern 260 is discolored by heat, light emitted from the light source 240 may be absorbed into the optical path control pattern 260, and thereby, light efficiency can be reduced.

The plurality of inorganic particles may include titanium oxide (TiOx) and/or silicon oxide (SiOx), where x of TiOx and SiOx are greater than zero, but types of inorganic particles according to embodiments of the present disclosure are not limited thereto.

The solvent may be a volatile material with a low viscosity. For example, the solvent may be at least one of solvent naphtha, xylene, and toluene, which are hydrocarbon-based materials, but types of solvents according to embodiments of the present disclosure are not limited thereto. Here, the viscosity of the solvent may be 1 to 2 cSt (25° C.), but embodiments of the present disclosure are not limited thereto.

Since the solvent included in the optical path control pattern 260 (or included in a substance manufactured for forming the optical path control pattern 260) has the low-viscosity, the plurality of inorganic particles can be sprayed without being aggregated even when the content of the plurality of inorganic particles increases.

Meanwhile, as the amount of the plurality of inorganic particles included in the optical path control pattern 260 increases, the amount of light that is reflected, scattered, and diffracted after having been emitted from the light source 240 in a vertical direction or a diagonal direction can increase. In this situation, the display device is able to provide uniform luminance for each area by enabling the optical path control pattern 260 to appropriately adjust a direction in which light emitted from the light source 240 travels.

However, as the amount of the plurality of inorganic particles in the materials used to form the optical path control pattern 260 increases, a phenomenon in which the plurality of inorganic particles aggregate in the materials for forming the optical path control pattern 260 may occur, and as a result, the optical path control pattern 260 may have different reflection, scattering, and diffraction characteristics for each area.

According to embodiments of the present disclosure, since the materials used for forming the optical path control pattern 260 include the low-viscosity solvent, such an aggregation phenomenon can be eliminated or reduced even when the amount of the plurality of inorganic particles increases.

That is, considering that the amount of the plurality of inorganic particles included in the optical path control pattern 260 may increase, the display device having uniform luminance can be provided by enabling the optical path control pattern 260 finally manufactured to appropriately adjust a direction in which light emitted from the light source 240 travels.

The materials used for forming the optical path control pattern 260 may include the polyester-based resin of 20 wt % to 35 wt %, the solvent of 20 wt % to 35 wt %, and the plurality of inorganic particles of 38 wt % to 50 wt %.

When the polyester-based resin included in the materials for forming the optical path control pattern 260 is less than 20 wt %, the plurality of inorganic particles serving to change traveling paths of light rays may not be effectively dispersed due to the lack of the matrix material. Further, when the polyester-based resin exceeds 35 wt %, as the weight % of the plurality of inorganic particles becomes reduced relative to the weight % of the matrix, the amount of light transmitting the optical path control pattern 260 may increase. As a result, one or more bright portions may occur, and in turn, image quality displayed through the backlight unit may be degraded.

When the solvent included in the materials for forming the light-directing pattern 260 is less than 20 wt %, the amount of the low-viscosity solvent may be insufficient, and thereby, an appropriate amount of the plurality of inorganic particles may not be included in the optical path control pattern 260. When the solvent in the materials for forming the optical path control pattern 260 exceeds 35 wt %, the content of the polyester-based resin serving as the matrix of the optical path control pattern 260 may become very reduced, in turn, leading a probability of the failure of the optical path control pattern 260 to increase.

In addition, when the plurality of inorganic particles included in the materials for forming the optical path control pattern 260 is less than 38 wt %, as the amount of the plurality of inorganic particles included in the optical path control pattern 260 finally formed is small, the amount of light rays whose traveling paths are changed may reduce, and the amount of light transmitting the optical path control pattern 260 may increase, resulting in a luminance non-uniformity phenomenon occurring. When the plurality of inorganic particles included in the materials for forming the optical path control pattern 260 exceeds 50 wt %, the aggregation phenomenon of the plurality of inorganic particles may occur.

As described above, the solvent according to embodiments of the present disclosure may be volatile, and the optical path control pattern 260 can be formed by the process of printing the materials for forming the optical path control pattern 260 on one surface of the base film 270, and thereafter, drying using heat. Since the solvent does not cause an additional reaction due to residual heat even after having dried the materials for forming the optical path control pattern 260, the occurrence of defects such as discoloration can be prevented or at least reduced.

During the process of thermally drying the materials for forming the optical path control pattern 260, some or all of the solvent may volatilize. Due to this, the thickness of the optical path control pattern 260 formed after having thermally dried the materials for forming the optical path control pattern 260 may be less than that of the materials for forming the optical path control pattern 260 on one surface of the base film 270.

As the thickness of the optical path control pattern 260 increases, an increased number of inorganic particles may be included without aggregation. According to embodiments of the present disclosure, nevertheless that the optical path control pattern 260 has a thin thickness, as the optical path control pattern 260 includes such a volatile and low-viscosity solvent, the light-directing pattern 260 can include an increasing content of the plurality of inorganic particles of 38 wt % to 50 wt %.

In other words, as the solvent having the volatility and low viscosity is included in the materials for forming the optical path control pattern 260, the plurality of inorganic particles having the increasing content of 38 wt % to 50 wt % can be dispersed into the materials for forming the optical path control pattern 260 without aggregation, and through the process of thermally drying the materials for forming the optical path control pattern 260, the solvent can be evaporated and the plurality of inorganic particles can be maintained such that the plurality of inorganic particles are evenly dispersed within the matrix of the light-directing pattern 260.

Therefore, through the optical path control pattern 260 according to embodiments of the present disclosure, the thickness of the backlight unit can be reduced, and at the same time, by causing light reaching the optical path control pattern 260 to be reflected, scattered or diffracted, an effect can be provided that reduces a difference in luminance between an area in which the light source 240 is disposed (an area in which an amount of light is relatively large) and an area between the light sources 240 (an area in which an amount of light is relatively small).

The adhesive layer 465 may be disposed between the base film 270 on which the optical path control pattern 260 is disposed and the light source protective element 250.

The light-directing pattern 260 may have a first thickness H1.

The first thickness H1 of the optical path control pattern 260 of FIG. 4 may be less than the thickness of the base film 270 and the thickness of the adhesive layer 465. The first thickness H1 of the optical path control pattern 260, the thickness of the base film 270, and the thickness of the adhesive layer 465 may refer to the shortest lengths in the direction in which the reflective plate 230 is stacked on the printed circuit 220.

The thickness of the base film 270 may be 6.6 times to 12.5 times greater than the first thickness H1 of the optical path control pattern 260. The thickness of the adhesive layer 465 may be 2 times to 6.25 times greater than the first thickness H1 of the optical path control pattern 260.

For example, the thickness of the base film 270 may be 100 µm to 120 µm, the first thickness H1 of the optical path control pattern 260 may be 8 µm to 15 µm, and the thickness of the adhesive layer 465 may be 30 µm to 50 µm. However, the thicknesses of these elements according to embodiments of the present disclosure are not limited thereto. For example, the first thickness H1 and thicknesses of the base film 270 and the adhesive layer 465 may be changed depending on sizes of the display device.

Thus, as the optical path control pattern 260 having a thin thickness is disposed in the backlight unit, by changing traveling paths of light rays emitted from the light source 240 and causing the light rays whose traveling paths are changed to be evenly spread, there are provided effects of improving image quality displayed through the backlight unit and at the same time, reducing the thickness of the backlight unit.

Meanwhile, the characteristics of the optical path control pattern 260 of the present disclosure are not limited thereto.

Referring to FIG. 5, materials for forming the optical path control pattern 260 may include an acrylic-based resin, a plurality of inorganic particles, and a photoinitiator. At least one of these materials for forming the optical path control pattern 260 is in the form of liquid (e.g., a type of ink).

The acrylic-based resin can serve as a matrix, the plurality of inorganic particles can serve to reflect light emitted from the light source 240, and the photoinitiator can serve to facilitate the UV curing of the materials for forming the light-directing pattern 260.

The optical path control pattern 260 finally formed using such materials may include the matrix material, the plurality of inorganic particles and the photoinitiator.

The acrylic-based resin, which is the matrix material of the optical path control pattern 260, may be epoxy acrylate, but types of acrylic-based resins according to embodiments of the present disclosure are not limited thereto.

Meanwhile, the matrix material of the optical path control pattern 260 and the material (e.g., polyester series) included in the base film 270 may be different from each other. In this case, an intermediate layer 566 may be disposed to improve adhesion between the optical path control pattern 260 and the base film 270.

The intermediate layer 566 may include at least one of an acrylic resin, a urethane resin, and a urethane acrylate copolymer resin, but embodiments of the present disclosure are not limited thereto.

The plurality of inorganic particles may include titanium oxide (TiOx) and/or silicon oxide (SiOx), where x of TiOx and SiOx are greater than zero, but types of inorganic particles according to embodiments of the present disclosure are not limited thereto.

The photoinitiator may include benzoin ethers, benzophenones/amines, acetophenones, or thioxanthones, but types of the photoinitiators according to embodiments of the present disclosure are not limited thereto.

The materials for forming the optical path control pattern 260 may include the acrylic-based resin of 30 wt % to 84 wt %.

When the acrylic-based resin included in the materials for forming the optical path control pattern 260 is less than 30 wt %, the plurality of inorganic particles serving to change traveling paths of light rays may not be effectively dispersed due to the lack of the matrix material. When the acrylic-based resin exceeds 84 wt %, acid component remaining after the materials of the optical path control pattern 260 material have been cured may cause the optical path control pattern 260 to be weak against moisture. In this case, moisture penetrating into the optical path control pattern 260 may cause the optical path control pattern 260 to be discolored, and the reflection, scattering or diffraction function of the optical path control pattern 260 to be deteriorated. Thereby, the light absorption rate of the optical path control pattern 260 may increase, and the light efficiency of the backlight unit may be degraded.

The materials for forming the optical path control pattern 260 may include the plurality of inorganic particles of 10 wt % to 15 wt %.

When the plurality of inorganic particles included in the materials for forming the optical path control pattern 260 is less than 10 wt %, the optical path control pattern 260 may not properly reflect, scatter, or diffract light emitted from the light source 240. As a result, a difference in luminance between some areas may occur, and in turn, the image quality of the display device may be deteriorated. Further, when the plurality of inorganic particles included in the materials for forming the optical path control pattern 260 exceeds 15 wt %, the amount of the plurality of particles becomes too large, and as a result, the aggregation phenomenon may occur without being properly dispersed in the acrylic-based resin.

The materials for forming the optical path control pattern 260 may include the photoinitiator of 1 wt % to 10 wt %.

When the photoinitiator included in the materials for forming the optical path control pattern 260 is less than 1 wt %, the process of performing UV curing for the materials of the optical path control pattern 260 may be effectively carried out. When the photoinitiator included in the materials for forming the optical path control pattern 260 exceeds 10 wt %, an additional curing reaction by the photoinitiator may continue even after the UV curing process has been completed, and thereby, a yellowing phenomenon of the optical path control pattern 260 may occur. As a result, as the optical path control pattern 260 absorbs light emitted from the light source 240, corresponding light efficiency may be reduced.

The materials for forming the optical path control pattern 260 of FIG. 5 can be mixed in an ink type in which the acrylic-based resin, the plurality of inorganic particles, and the photoinitiator are mixed, and printed on at least one surface of the base film 270. Thereafter, using the UV curing, the optical path control pattern 260 can be formed through the process of curing the ink in which the acrylic-based resin, the plurality of inorganic particles, and the photoinitiator are mixed.

As described above, since the materials for forming the optical path control pattern 260 is formed through the UV-curing process, a process time for forming the optical path control pattern 260 may be reduced, and this enables mass production of the display device to be carried out.

An adhesive material may be printed on one surface of the base film 270 on which the optical path control pattern 260 is formed, and the corresponding adhesive layer 465 may be formed by performing the UV curing for the printed adhesive material.

The optical path control pattern 260 may have a second thickness H2. The second thickness H2 of the optical path control pattern 260 of FIG. 5 may be greater than the first thickness H1 of the light-directing pattern 260 of FIG. 4. The second thickness H2 of the optical path control pattern 260 may refer to the shortest length in the direction in which the reflective plate 230 is stacked on the printed circuit 220.

The thickness of the base film 270 may be 3 times to 6 times greater than the second thickness H2 of the optical path control pattern 260. The thickness of the adhesive layer 465 may be 1 times to 2.5 times greater than the second thickness H2 of the optical path control pattern 260.

For example, the thickness of the base film 270 may be 100 µm to 120 µm, the second thickness H2 of the optical path control pattern 260 may be 20 µm to 30 µm, and the thickness of the adhesive layer 465 may be 30 µm to 50 µm. However, the thicknesses of these elements according to embodiments of the present disclosure are not limited thereto. For example, dimensions of these elements may be changed depending on sizes of the display device.

Thus, as the optical path control pattern 260 in included the backlight unit changes traveling paths of light rays emitted from the light source 240 and causes the light rays to evenly disperse, there are provided effects of improving image quality displayed through the backlight unit and at the same time, reducing the thickness of the backlight unit.

Figure 6:
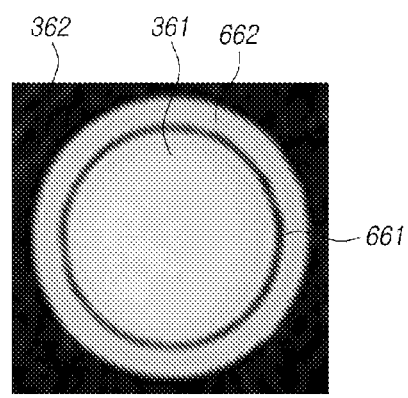
FIG. 6 illustrates an example image in another partial area of the backlight unit according to one embodiment of the present disclosure.

FIG. 6 illustrates an example image in another partial area of the backlight unit according to embodiments of the present disclosure.

Referring to FIG. 6, the backlight unit according to embodiments of the present disclosure may include one or more light sources 240.

When the light source 240 is driven to emit light, the backlight unit may include a first area 361, a second area 362, a third area 661, and a fourth area 662, which are different from one another.

The first area 361 may be an area in which some of light emitted from the light source 240 is reflected by each, or one or more of, one or more optical path control patterns 260.

The third area 661 may surround the first area 361 and be an area in which some of the light emitted from the light source 240 travels toward the display panel without being reflected by the light-directing pattern 260.

The fourth area 662 may surround the third area 661 and the first area 631 and be an area in which some of the light emitted from the light source 240 is reflected by the optical path control pattern 260.

The second area 362 may surround the fourth area 662, the third area 661, and the first area 361 and be an area in which some of the light emitted from the light source 240 travels toward the display panel without being reflected by the optical path control pattern 260.

The backlight unit having this structure will be specifically discussed with reference to FIGS. 7 to 8.

Figure 7:
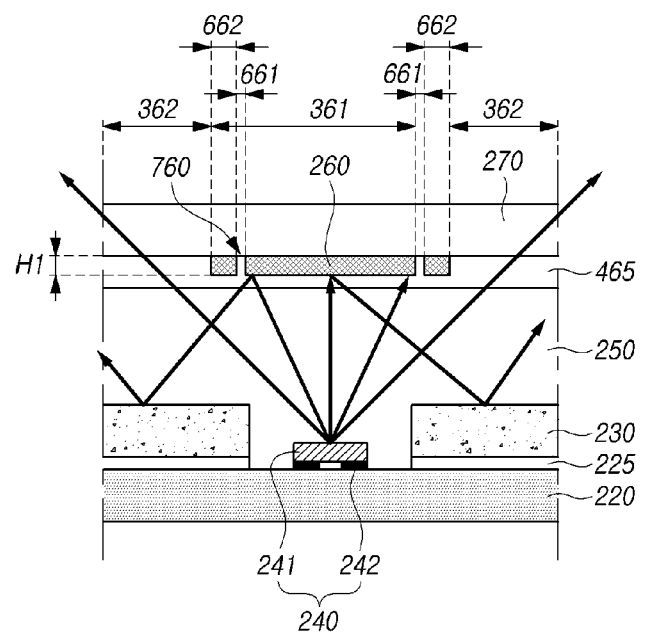
FIGS. 7 and 8 illustrate example structures related to another partial area of the backlight unit according to embodiments of the present disclosure.
Figure 8:
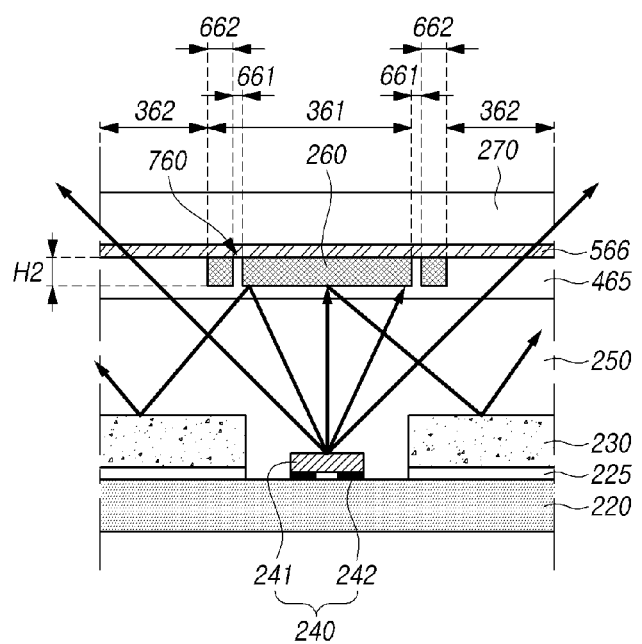

FIGS. 7 and 8 illustrate example structures related to another partial area of the backlight unit according to aspects of the present disclosure.

In the following description, some configurations, effects etc. of the embodiments or examples discussed above may not be repeatedly described for convenience of description. Further, in the following description, like reference numerals will be used for configurations or elements equal to those of embodiments or examples described above.

Referring to FIGS. 7 and 8, the backlight unit may include the optical path control pattern 260 disposed on at least one surface of a base film 270.

The optical path control pattern 260 may include at least one hole 760.

The backlight unit according to aspects of the present disclosure may include the first area 361, the second area 362, the third area 661, and the fourth area 662, which are different form one another.

The first area 361 may include an area in which the optical path control pattern 260 overlapping the light source 240 is disposed.

The third area 661 may include an area corresponding to the hole 760 of the optical path control pattern 260.

The fourth area 662 may include an area corresponding to at least a part of the optical path control pattern 260. The fourth area 662 may be an area of the optical path control pattern 260 spaced apart by the hole 760 from an area of the optical path control pattern 260 including an area overlapping the light source 240. In this case, the hole 760 may be interposed between the fourth area 662 and the first area 361.

The second area 362 may include an area that does not overlap the optical path control pattern 260 including the first area 361, the third area 661, and the fourth area 662.

In the first and fourth areas 361 and 662, traveling paths of some of light rays emitted from the light source 240 may be changed by the optical path control pattern 260, and some of the light rays may transmit the optical path control pattern 260.

Further, in the second and third areas 362 and 661, some of the light rays emitted from the light source 240 may directly enter the base film 270, or some of the light rays having changed traveling paths due to the optical path control pattern 260 may enter the base film 270.

When most of the light rays emitted from the light source do not transmit the optical path control pattern 260 and traveling paths thereof are changed, an area in which the optical path control pattern 260 is disposed may be viewed darker than other areas.

In contrast, in a case where the optical path control pattern 260 includes at least one hole 760, some of the light emitted from the light source 240 can directly enter the base film 270 through the light source protective element 250, and thereafter, can enter the display panel 110 after having passed through a diffusion plate 280 and an optical sheet 285.

In other words, as the optical path control pattern 260 includes at least one hole 760, the amount of light rays whose traveling paths are changed by the optical path control pattern 260 can be reduced. Therefore, the amount of light transmitting an area corresponding to an area in which the optical path control pattern 260 is disposed can be increased and be matched to be similar to the amount of light exiting one or more other neighboring areas (in which the light-directing pattern is not disposed), as a result, enabling the luminance uniformity of the backlight unit to be improved.

The backlight unit of FIG. 7 may include the optical path control pattern 260 and an adhesive layer 465 that are disposed between the light source protective element 250 and the base film 270.

Here, the optical path control pattern 260 may include a matrix material and a plurality of inorganic particles. Further, in some instances, the light-directing pattern 260 finally formed may include the matrix material, the plurality of inorganic particles, and a small amount of the solvent.

For example, the matrix material may include a polyester-based resin.

The plurality of inorganic particles may include titanium oxide (TiOx) and/or silicon oxide (SiOx).

The solvent may be a volatile material with a low viscosity. For example, the solvent may be at least one of solvent naphtha, xylene, or toluene, which is a hydrocarbon-based material.

Referring to FIG. 8, the optical path control pattern 260 included in the backlight unit may include a matrix material, a plurality of inorganic particles, and a photoinitiator.

For example, the matrix material may include an acrylic-based resin.

The plurality of inorganic particles may include titanium oxide (TiOx) and/or silicon oxide (SiOx).

The photoinitiator may include benzoin ethers, benzophenones/amines, acetophenones, or thioxanthones.

The first thickness H1 of the optical path control pattern 260 of FIG. 7 may be less than the second thickness H2 of the light-directing pattern 260 of FIG. 8.

Figure 9:
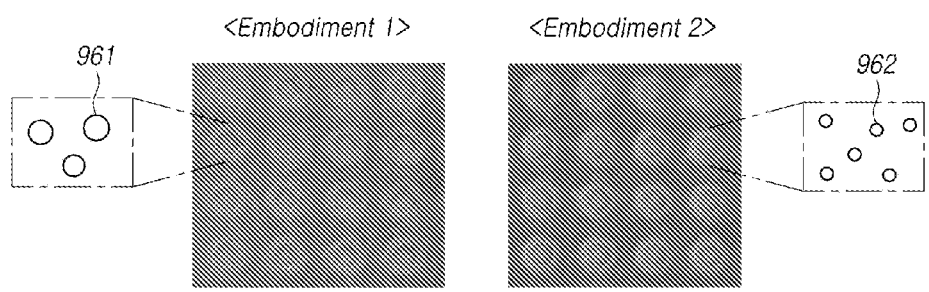
FIG. 9 illustrates that a light source that emits light in the respective situations of FIGS. 7 and 8 according to embodiments of the present disclosure.

FIG. 9 illustrates that the light source 240 emits light in the respective embodiments of FIGS. 7 and 8.

The images of FIG. 9 may represent situations before light emitted from the light source 240 reaches the diffusion plate of the backlight unit.

Embodiment 1 of FIG. 9 represents an image when the light source 240 included in the backlight unit shown in FIG. 7 emits light. The thickness of the optical path control pattern 260 in embodiment 1 of FIG. 9 may be 11 μm to 12 μm for example.

Embodiment 2 represents an image when the light source 240 included in the backlight unit shown in FIG. 8 emits light. The thickness of the optical path control pattern 260 in embodiment 2 of FIG. 9 may be 26 μm to 30 μm for example.

Referring to FIG. 9, when the light source 240 is driven to emit light, it can be seen that the luminance of the structure in Embodiment 1 and the luminance of the structure in Embodiment 2 are similar.

Even though the thickness of the optical path control pattern 260 in embodiment 1 is smaller than the thickness of the optical path control pattern 260 in Embodiment 2, the light-directing pattern 260 in embodiment 1 may have the content of the plurality of inorganic particles included per unit area greater than the optical path control pattern 260 in embodiment 2, and thus, the luminance in embodiments 1 and 2 may be maintained at the same level.

Further, the size of the plurality of inorganic particles 961 included in the optical path control pattern 260 260 in embodiment 1 may be greater than a size of the plurality of inorganic particles 962 included in the optical path control pattern 260 in embodiment 2. Here, the size of the plurality of inorganic particles (961, 962) may be the diameter of the plurality of inorganic particles (961, 962)

As the size of the plurality of inorganic particles (961, 962) decreases, the surface area of the plurality of inorganic particles (961, 962) increases, and thereby, the traveling paths of light rays emitted from the light source 240 can be easily changed.

That is, the optical path control pattern 260 according to embodiments of the present disclosure can adjust an amount of light for changing the traveling paths of light rays emitted from the light source 240 by adjusting the content of the plurality of inorganic particles (961, 962) according to the thickness of the light-directing pattern (the thickness of the light-directing pattern is proportional to the content of the plurality of inorganic particles) and the size of the plurality of inorganic particles (961, 962).

Figure 10:
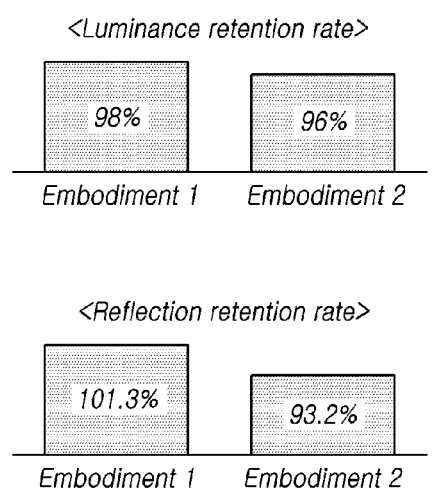
FIG. 10 illustrates luminance retention rates and reflection retention rates (or light-directing retention rates) for the respective structures of embodiments 1 and 2 described herein.

FIG. 10 illustrates luminance retention rates and reflection retention rates (or light-directing retention rates) for respective structures of embodiments 1 and 2.

Embodiments 1 and 2 of FIG. 10 include the same structure and the same configuration as embodiments 1 and 2 described in FIG. 9.

To evaluate luminance retentions and reflection retentions according to embodiments 1 and 2 of FIG. 10, the luminance of a partial configuration of the backlight unit of embodiment 1 (the configuration shown in FIG. 7) and the luminance of a partial configuration of the backlight unit of embodiment 2 (the configuration shown in FIG. 8) were measured for 200 hours at a temperature of 60° C. and a driving current of 2.6 mA. In particular, for evaluating the reflection retention, a reflection retention for a blue wavelength among visible light wavelengths was measured.

When the luminance maintenance ratio of the backlight unit before being driven under the above-described conditions is 100%, the measurement of the luminance retention rates of embodiments 1 and 2 shows similar levels. Thus, it can be seen that the luminance was not significantly reduced even when being driven at the high temperature for the long time.

Further, when the reflection retention rate of the backlight unit before being driven under the above-described conditions is 100%, it can be seen that in the case of embodiment 1, a measured reflection retention rate is higher than 100%. Although a measured reflection retention rate in the case of embodiment 2 is less than that of the structure of embodiment 1, as it is remained at 93.2%, it can be therefore seen that the excellent retention rate is exhibited.

In particular, in the case of a display device requiring high luminance characteristics, such a display device may be driven with a high driving current. In the display device according to embodiments of the present disclosure, it can be seen that the luminance characteristic and the reflection characteristic of the light-directing pattern can be remained even when the display device is driven with a high driving current.

Figure 12:
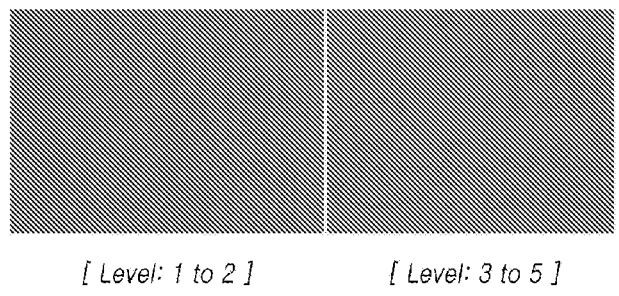
FIG. 12 illustrates evaluation images in a dark environment according to the lattice pattern defect levels.

FIG. 11 illustrates specific conditions of the light-directing pattern in embodiments 1 and 2 and corresponding lattice pattern defect levels (lattice mura levels). FIG. 12 illustrates evaluation images in a dark environment according to the lattice pattern defect levels.

Embodiments 1 and 2 of FIG. 11 include the same structure and the same configuration as embodiments 1 and 2 described in FIG. 9.

The thickness of the light-directing pattern in Embodiment 1 of FIG. 11 is 8 μm to 15 μm for example. The content of the plurality of inorganic particles included in the light-directing pattern may be 35 wt % to 50 wt %.

Referring to FIG. 11, it can be seen that in Embodiment 1, when the content of the plurality of inorganic particles included in the light-directing pattern is 35 wt %, 42 wt %, and 50 wt %, the resulting lattice pattern defect levels are in the range of 1 to 1.5.

As shown in FIG. 12, it can be seen that when the lattice pattern defect levels are 1 to 2, image artifacts caused due to the luminance non-uniformity is not recognized, but when the lattice pattern defect levels are 3 to 5, image artifacts caused due to the luminance non-uniformity is recognized.

That is, it can be seen that in embodiment 1, when the content of the plurality of inorganic particles included in the light-directing pattern is 35 wt %, 42 wt %, and 50 wt %, no image artifacts are recognized.

The thickness of the light-directing pattern in embodiment 2 of FIG. 11 is 20 μm to 30 μm for example. The content of the plurality of inorganic particles included in the light-directing pattern may be 10 wt % to 15 wt %, and in this case, as the resulting lattice pattern defect levels are 1 to 2, it can be seen that no image artifacts are recognized.

The embodiments described above will be briefly described as follows.

The backlight unit according to aspects of the present disclosure and the display device including the backlight unit can include the plurality of light sources 240 disposed on the printed circuit 220, the light source protective element 250 located on the light sources 240, the base film 270 located on the light source protective element, 250 and one or more optical path control patterns 260, each of which is located to correspond to each of the plurality of light sources 240, that are disposed on at least one of both surfaces of the base film 270 and configured to direct traveling paths of at least some of incident light rays, the one or more optical path control patterns 260 including an acrylic-based resin or a polyester-based resin and at least one type of inorganic particles (961, 962) dispersed in the acrylic-based resin or the polyester-based resin.

Further, the optical path control pattern 260 can include the acrylic-based resin, the plurality of the inorganic particles (961, 962), and can further include the photoinitiator.

In this case, the thickness of the base film 270 may be 3 times to 6 times greater than the thickness of the optical path control pattern 260.

The backlight unit and the display device can further include the adhesive layer 465 disposed between the base film 270 and the light source protective unit 250, and the thickness of the adhesive layer 465 may be 1 to 2.5 times greater than the thickness of the optical path control pattern 260.

The optical path control pattern 260 can include the polyester-based resin and the plurality of inorganic particles (961, 962).

In this case, the thickness of the base film 270 may be 6.6 times to 12.5 times greater than the thickness of the optical path control pattern 260.

The adhesive layer 465 may be further disposed between the base film 270 and the light source protective unit 250, and the thickness of the adhesive layer 465 may be 2 to 6.25 times greater than the thickness of the optical path control pattern 260.

The content of the plurality of inorganic particles (961, 962) included in the light-directing pattern 260 may be greater than the content of the polyester-based resin.

One or more optical path control patterns 260 may include at least one first hole 760.

The one or more optical path control patterns 260 including the at least one first hole 760 may include the first area 361, another area 661 surrounding the first area 361, and further another area 662 surrounding an area 661 different from the first area 361. The first area 361 and the further another area 662 may be areas in which traveling paths of some of light rays emitted from the light source 240 are changed, and another area 661 may be an area in which traveling paths of some of the light rays emitted from the light source 240 are not changed.

The other area 661 may be an area corresponding to the first hole 760.

The backlight unit and the display device can further include the reflective plate 230 disposed on the printed circuit 220 including a plurality of second holes located in an area, or respective areas, corresponding to the light sources 240, and the light source protective element 250 may be disposed inside of the second holes included in the reflective plate 230 and on the reflective plate.

One or more optical path control patterns 260 may overlap one second hole.

A plurality of convex portions (or protrusions) may be disposed on at least one surface of the base film 270, and each corresponded to each of the light sources 240 and/or to each of the optical path control patterns 260.

Further, the display device can the display panel 110 located over the backlight unit and receiving light from the backlight unit.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A backlight unit comprising:
   a plurality of light sources on a printed circuit;
   a light source protective element on the plurality of light sources;
   a base film on the light source protective element; and
   a plurality of optical path control patterns on at least one surface of the base film, each of the plurality of optical path control patterns overlapping a corresponding light source from the plurality of light sources and configured to control optical paths of light generated by the corresponding light source that is incident on the optical cal path control pattern,
   wherein the plurality of optical path control patterns comprise an acrylic-based resin or a polyester-based resin at least one type of inorganic particles dispersed in the acrylic-based resin or the polyester-based resin and a photoinitiator, wherein the plurality of optical path control patterns include the photoinitiator of 1 wt % to 10 wt, wherein the plurality of optical path control patterns comprise a plurality of protrusions disposed on at least one surface of the base film.

2. The backlight unit according to claim 1, wherein a thickness of the base film is 3 to 6 times greater than a thickness of the plurality of optical path control patterns.

3. The backlight unit according to claim 1, further comprising:

an adhesive layer between the base film and the light source protective element, wherein a thickness of the adhesive layer is 1 to 2.5 times greater than a thickness of the plurality of optical path control patterns.

4. The backlight unit according to claim 1, wherein the plurality of optical path control patterns comprise the polyester-based resin and the at least one type of inorganic particles.

5. The backlight unit according to claim 4, wherein a thickness of the base film is 6.6 to 12.5 times greater than a thickness of the plurality of optical path control patterns.

6. The backlight unit according to claim 4, further comprising:

an adhesive layer between the base film and the light source protective element, wherein a thickness of the adhesive layer is 2 to 6.25 times greater than a thickness of the plurality of optical path control patterns.

7. The backlight unit according to claim 4, wherein a content ratio of the at least one type of inorganic particles is greater than a content ratio of the polyester-based resin.

8. The backlight unit according to claim 1, wherein at least one of the plurality of optical path control patterns comprises at least one first hole.

9. The backlight unit according to claim 8, wherein the plurality of optical path control patterns further comprises a first area, a second area surrounding the first area, and a third area surrounding the second area, and wherein the first area and the third area are areas in which optical paths of first light emitted from at least one of the plurality of light sources are changed, and the second area is an area in which optical paths of second light emitted from the at least one of the plurality of light sources are unchanged.

10. The backlight unit according to claim 9, wherein the at least one first hole is in the second area but not the first area and the third area.

11. The backlight unit according to claim 1, further comprising:

a reflective plate on the printed circuit, the reflective plate comprising a plurality of holes in which the plurality of light sources are disposed, wherein the light source protective element is disposed within of the plurality of holes in the reflective plate and on an upper surface of the reflective plate.

12. The backlight unit according to claim 11, wherein at least one of the plurality of optical path control patterns overlaps at least one of the plurality of holes of the reflective plate.

13. A display device comprising:

the backlight unit according to claim 1; and a display panel on the backlight unit, the display panel receiving the light from the backlight unit.

14. A backlight unit comprising:

a reflective plate comprising a plurality of holes;

a plurality of light sources, each of the plurality of light sources disposed in a corresponding one of the plurality of holes;

a light source protective element on the plurality of light sources within the plurality of holes;

a base film on the light source protective element; and a plurality of optical path control patterns on at least one surface of the base film, each of the plurality of optical path control patterns overlapping a corresponding light source from the plurality of light sources and configured to control optical paths of light generated by the corresponding light source that is incident on the optical path control pattern, wherein a height of the reflective plate is greater than a height of the plurality of light sources, wherein at least one optical path control pattern from the plurality of optical path control patterns comprises a matrix and a plurality of inorganic particles dispersed in the matrix, wherein the matrix comprises an acrylic-based resin and the at least one optical path control pattern further comprises a photoinitiator, wherein the at least one optical path control pattern includes the photoinitiator of 1 wt % to 10 wt, wherein the plurality of optical path control patterns comprise a plurality of protrusions disposed on at least one surface of the base film.

15. The backlight unit according to claim 14, wherein a thickness of the base film is 3 to 6 times greater than a thickness of the at least one optical path control pattern.

16. The backlight unit according to claim 15, further comprising:

an adhesive layer between the base film and the light source protective element, wherein a thickness of the adhesive layer is 1 to 2.5 times greater than a thickness of the at least one optical path control pattern.

17. The backlight unit according to claim 14, wherein the matrix comprises a polyester-based resin and a thickness of the base film is 6.6 to 12.5 times greater than a thickness of the at least one optical path control pattern.

* * * * *